(12) United States Patent
Brown et al.

(10) Patent No.: US 11,577,632 B2
(45) Date of Patent: Feb. 14, 2023

(54) SHOCK MITIGATION SEAT AND SHOCK MONITORING SYSTEM

(71) Applicant: Shock-WBV Limited, Romsey (GB)

(72) Inventors: Graham Brown, Southampton (GB); Tom Coe, Bristol (GB)

(73) Assignee: Shock-WBV Limited, England (GB)

( * ) Notice: Subject to any disclaimer, the term of this patent is extended or adjusted under 35 U.S.C. 154(b) by 0 days.

(21) Appl. No.: 17/622,782

(22) PCT Filed: Nov. 12, 2020

(86) PCT No.: PCT/IB2020/060666
§ 371 (c)(1),
(2) Date: Dec. 24, 2021

(87) PCT Pub. No.: WO2021/094979
PCT Pub. Date: May 20, 2021

(65) Prior Publication Data
US 2022/0242284 A1 Aug. 4, 2022

(30) Foreign Application Priority Data
Nov. 12, 2019 (GB) .................................... 1916440

(51) Int. Cl.
*B60N 2/427* (2006.01)
*B60N 2/42* (2006.01)
(Continued)

(52) U.S. Cl.
CPC .......... *B60N 2/427* (2013.01); *B60N 2/4242* (2013.01); *B60N 2/707* (2013.01); *B62J 1/18* (2013.01);
(Continued)

(58) Field of Classification Search
CPC ...... B60N 2/427; B60N 2/4242; B60N 2/707; B60N 2002/981; B60N 2/7082; B62J 1/18; B63B 29/04; B63B 2029/043
See application file for complete search history.

(56) References Cited

U.S. PATENT DOCUMENTS 2,082,151 A * 6/1937 Tyrel ...................... B60N 2/707
297/DIG. 3
2,343,996 A 3/1944 Perry
(Continued)

FOREIGN PATENT DOCUMENTS

DE 102011010047 12/2011
EP 3045080 7/2016
(Continued)

OTHER PUBLICATIONS

Response in GB1916440.9 dated Sep. 24, 2020.
(Continued)

*Primary Examiner* — Philip F Gabler
(74) *Attorney, Agent, or Firm* — William H. Bollman

(57) ABSTRACT

A shock mitigation seat 10 includes a plurality of individual shock absorbing members 16 resilient to compression from a shock impact. The shock absorbing members 16 are positioned one adjacent another and such that at a certain stage of compression an individual shock absorbing member 16 resiliently deforms and comes into contact with one or more adjacent individual shock absorbing members 16 which thereby increases resistance to further compression. The seat may be incorporated in a shock mitigation system 50 which has at least one sensor operable to detect a force and to provide a feedback signal indicative of the nature of the force and a memory record the incidence and severity of these forces and provides an indication of cumulative forces absorbed.

26 Claims, 5 Drawing Sheets

(51) Int. Cl.
  *B60N 2/70* (2006.01)
  *B62J 1/18* (2006.01)
  *B63B 29/04* (2006.01)
  *B60N 2/90* (2018.01)

(52) U.S. Cl.
  CPC ............ *B63B 29/04* (2013.01); *B60N 2/7082* (2013.01); *B60N 2002/981* (2018.02); *B63B 2029/043* (2013.01)

(56) References Cited

U.S. PATENT DOCUMENTS

| | | | |
|---|---|---|---|
| 2,627,302 A | | 9/1948 | Forsyth |
| 2,627,077 A | | 2/1953 | Forsyth |
| 2,672,183 A | | 3/1954 | Forsyth |
| 2,821,244 A | | 1/1958 | Beck |
| 5,769,492 A | * | 6/1998 | Jensen .................. A47C 9/002 297/188.09 |
| 9,821,689 B2 | * | 11/2017 | Busboom ............... A01D 34/64 |
| 10,934,156 B2 | * | 3/2021 | Tillner .................. B68G 11/06 |
| 11,433,788 B2 | * | 9/2022 | Helin ..................... F16F 1/025 |
| 2006/0123553 A1 | * | 6/2006 | Jansen ................... A47C 27/16 5/727 |
| 2018/0312086 A1 | | 11/2018 | Meingast |
| 2019/0135150 A1 | | 5/2019 | Gao et al. |

FOREIGN PATENT DOCUMENTS

| | | |
|---|---|---|
| FR | 787613 | 9/1935 |
| GB | 874294 A | 8/1961 |
| WO | 2018/124197 | 7/2018 |

OTHER PUBLICATIONS

Amended Specification filed with response in GB1916440.9 dated Sep. 24, 2020.
Letter Intention to Grant 18(4) in GB1916440.9 dated Sep. 22, 2021.
Notification of Grant in GB1916440.9 dated Nov. 9, 2021.
Combined Search and Examination Report under Sections 17 & 18(3) in GB1916440.9 dated Apr. 23, 2020.
Letter with Combined Search and Examination Report in GB1916440.9 dated Apr. 23, 2020.
"Letter Response" in GB 1916440.9, dated Sep. 24, 2020.
"Intention to Grant" in GB 1916440.9, dated Sep. 22, 2021.
"International Search Report of the International Searching Authority" in PCT/IB2020/060666, dated Feb. 19, 2021.

* cited by examiner

SHOCK MITIGATION SEAT AND SHOCK MONITORING SYSTEM

FIELD

The present invention relates to a shock mitigation seat for use in a vehicle or marine craft and to an associated shock monitoring and measurement system.

BACKGROUND

When a wheeled vehicle travels over rough terrain impact shocks can be transmitted to passengers seated within the vehicle, despite the provision of shock absorbing systems between the wheels and the main body of the vehicle. Impact intensities increase significantly with the roughness of the terrain and with the speed of travel.

A similar situation occurs for vessels travelling over water, where transmission of impact forces tends to be exaggerated by the lack of any equivalent to the aforementioned shock absorbing systems, such as springs, which are associated with the wheeled vehicles. To some extent there a similar experience can be encountered when an aircraft is subjected to severe air turbulence.

The most severe examples of impact are usually encountered in vessels travelling over water, especially in those travelling at high speeds, such as speedboats and rigid inflatable boats (RIBs). The frequency of occurrence of shock impact is therefore at least as concerning as the severity of an individual impact event. There is increasing medical evidence that there are dangers from both the intensity of high impact shocks as well as from the repetitive but higher frequency of smaller impact shocks.

The nominally "safe vibration dose" is usually accepted to be those applied by general industrial health and safety regulations and associated international standards where, variously, average acceleration and dose measures are applied. Indeed, there is recent European legislation which requires these standards to be observed in the workplace across Europe. The UK Maritime & Coastguard Agency has issued guidelines as to what is safe, based on the aforementioned European regulations. In many jurisdictions therefore there is increasing legislative pressure on companies and employers to conform to these regulations as well as to take all reasonable precautions to reduce exposure of personnel and employees to excessive shock and exposure to such vibrational forces.

Various efforts have been made to tackle the problem of exposure to shock impacts, especially in the marine environment. One system adopted for RIBs and the like is the so-called "long-travel seat". This system, like many others, is an arrangement for supporting a seat while connecting it to the floor, or chassis, of the craft or vehicle. In this case it is essentially a "lazy tongs" type arrangement of jointed and pivoted bars, the compression of which is controlled by a conventional shock absorber or damper. Some of these existing systems are expensive to buy and install as well as complex to maintain.

While such systems can be effective, they have an inherent danger. The danger is that which is often referred to as "bottoming out". This occurs when the vessel is subjected to a shock impact of sufficient magnitude that an end stop of a damper is reached and there is no longer any resistance to impact with the consequence that an occupant may be subjected to an excessively high force with the risk of injury, in particular spinal injury.

It has been shown that in such circumstances, not only may there be metal-to-metal contact with no further shock mitigation, but in that position there can be amplification of the shock impulse, especially when at sea as the vessel encounters waves more quickly than the system can recover and situations occur when a boat is freefalling onto a rising crest of a wave. There are many variations of such seat support systems and often the term "suspension" seat is used.

This problem is increasingly encountered by those working offshore who travel to a location on a high speed boat in order to perform maintenance and repair of installations such as wind turbines, bridges and offshore platforms or installations.

These variations may also suffer from the bottoming-out problem. In fact, for certain recognised levels of shock impact, there is no currently available equipment which allows the limit values set out in legislation to be met under all operational conditions. Thus, the legislation is subject to an as low as reasonably practicable (ALARP) caveat.

Various attempts have been made to mitigate these problems and some are described in the following systems.

There is therefore a need for a cost effective solution that is compact and simple and quick to install which addresses the problem of bottoming-out.

PRIOR ART

One example of a cushioning seat is described in United States patent U.S. Pat. No. 2,627,077 (FORSYTH) which discloses a seat comprising an inflatable deformable resilient element of generally cylindrical formation and having rounded ends, a valve carried by the element, strips extending longitudinally of the element and having edge portions thereof engaging the top and bottomed faces of the element respectively.

U.S. Pat. No. 2,672,183 (FORSYTH) discloses a seat comprising a plurality of pneumatic elements arranged in a side by side relationship having a general cylindrical formation with rounded ends and each having a valve carried thereby, a fabric casing enclosing each element, a rigid bar fastened to each casing and adapted to support the casing in the direction of the cylindrical axis.

U.S. Pat. No. 2,627,302 A (FORSYTH) discloses a seat cushion comprising a rigid support, a plurality of rigid parallel spaced bars extending across and supported by the support.

U.S. Pat. No. 2,343,996 (AIRTRESS CORP OF AMERICA) discloses improvements in pneumatic cushions and pads.

United States patent application US 2019/135150 A1 (UNIV JILIN) discloses an array type automobile seat profile adaptive-adjusting apparatus.

UK patent application GB 874 294 A (DAIMLER BENZ AG) discloses a vehicle seat with a seat cushion, seat frame and springing system comprising main spring elements.

European patent application EP 3045080 A1 (FUJIKURA LTD) discloses a seat device with a cushion pad, a support member for supporting the cushion pad, a pressure sensitive switch and a pressing member.

The present invention seeks to mitigate impact shocks to a vehicle being transmitted to passengers seated within the vehicle, either directly or in combination with known shock mitigation systems.

SUMMARY OF THE INVENTION

According to a first aspect of the present invention there is provided a shock mitigation seat including a plurality of individual shock absorbing members resilient to compression from a shock impact, the shock absorbing members being positioned one adjacent another and such that at a certain stage of compression an individual shock absorbing member resiliently deforms and comes into contact with one or more adjacent individual shock absorbing members which thereby increase resistance to further compression, wherein at least one shock absorbing member is in the form of an annulus of resilient material.

Ideally the shock absorbing members are tubular, and an annulus is defined in a section orthogonal to a longitudinal axis thereof.

In some embodiment the tubular shock absorbing members are open-ended. Ends of one or more shock absorbing members may be covered in order to prevent foreign objects from being inserted into an internal hollow of the shock absorbing members. Optionally they may be sealed to define a closed envelope.

Beneficially, at least one of the shock absorbing members has integral upper and lower platforms which may comprise planar sheets of materials.

Webs may be provided within the shock absorbing members to improve rigidity as well as assist in recovery of the shock absorbing members quickly As the shock absorbing members are formed from a resiliently deformable material there is no hysteresis.

Webs in adjacent sections may be different thickness. So for example webs towards a central or part of a seat that is normally weight bearing may be thicker than those webs located around a seat periphery or edge.

Adjacent shock absorbing members may be different thicknesses.

Sections of resilient materials which are used as the shock absorbing in the shock mitigation seat are ideally extruded.

Optionally some of the shock absorbing members may be ellipsoid in cross section.

In some embodiments tubular shock absorbing members are placed one adjacent another. In another embodiment the shock absorbing members are provided as ellipses and are placed one against another so that their major elliptical axes are all parallel. In another embodiment the elliptical shock absorbing members are placed on against another so that a major axis of a first shock absorbing member is placed against edges of adjacent ellipsoids are perpendicular one to another.

In this way the seat is configured to absorb different types of force and to offer effectively different resistance to these different forces. Thus for example the seat may include different types of shock absorbing members and/or different sizes of shock absorbing members, and/or shock absorbing members arranged in different orientations, so as to form a multiple Also beneficially, at least one of the shock absorbing members contains a centrally positioned spring.

Preferably, at least one of the shock absorbing members has an internal bump stop. Beneficially, the configuration of at least one of the shock absorbing members at one position is different to the configuration of at least one other of the shock absorbing members at another position which may be dependent upon different compressive forces applied at those positions when the seat is in use. In one embodiment therefore the configuration of at least one of the shock absorbing members is therefore dependent upon its position within the seat.

Preferably, at least one of the shock absorbing members is formed of a thermoplastic polyurethane polymer.

In some embodiments the shock mitigation seat includes at least one of the shock absorbing members has at least one cross-sectional strengthening rib.

Ideally the thickness of the cross-sectional strengthening ribs is between 1 mm thick and 5 mm thick.

Preferably the shock absorbing members are supported on a foot which is ideally fabricated from a single extruded workpiece. The foot may comprise a planar sheet of a flexible material.

Ideally the foot is square or rectangular and contacts an adjacent foot which supports an adjacent shock absorbing member.

In a preferred embodiment adjacent feet are offset or staggered with respect one to another. In some embodiments adjacent feet are interconnected. Optionally adjacent feet are interconnected by way of a hinge which preferably comprises a length of wire or flexible line. This enables a sheet of members to be connected together by way of hinges which permit the members to flex in one plane and thereby accommodate lateral movement of a seat occupant.

In some embodiments the shock mitigation seat includes a foam layer placed thereon and/or thereunder. Preferably the, or each, foam layer is removable and replaceable.

Preferably the thickness of at least one layer of foam is between 5 mm thick and 50 mm thick.

In some embodiments two or more shock absorbing members may be laid one on another. An advantage of this is that the different layers of shock absorbing members are formed from different types of resiliently deformable material. Therefore the material forming the first layer has a first shock absorbance characteristic and the resilient material forming the second layer has a second shock absorbance characteristic. The combined effect of these two layers is felt to reduce actual forces felt and thereby enhance shock resistance to a seat occupant.

Ideally the seat is shaped and dimensioned for use on a cycle or motorcycle or mountain bicycle.

In some embodiments the shock mitigation seat is shaped and dimensioned for use in an off-road vehicle and is optionally removable and replaceable. An advantage with this is that the shock mitigation seat may be deployed and connected to an existing car seat for use in rough terrains.

Alternatively car seats may be modified to include the shock mitigation seat, for example beneath an existing later of cushioning.

When installed shock absorbing members may be coated with a fire retardant.

Reference has been made to passive shock absorption and it is appreciated that the arrangement may also be included in an active shock absorption system in which a rheological fluid is included in a sealed container or envelope housed within at least one section of a shock absorbing member in order to provide an active force absorbing device. The rheological fluid may include a ferromagnetic material, such as iron filings.

According to another aspect of the invention there is provided a shock monitoring system which includes the aforementioned shock mitigation seat and at least one sensor which is operable to detect a force, such as compressive force, a tensile force, a twisting or torsional force and an acceleration force, and to provide a feedback signal indicative of the nature of the force.

Ideally the shock monitoring system includes a processor, such as a microprocessor, and a memory, the processor is operative to monitor the feedback signals and to derive a value which is indicative of a maximum shock load (impulse) which exceeds a user defined threshold. Additionally cumulative loads, indicative of a total of shock loads (vibration forces), to which a seat occupant has been subjected in a predefined time may also be stored in the memory. The memory is therefore operative to record the maximum shock load and the total shock load.

In some embodiments the shock monitoring system includes a wireless transmitter which is operative to transmit data stored in the memory, which may include maximum shock load data and total shock load data, to a remote receiver for storage on a database, analysis by a computer or presentation on a display.

Optionally the wireless may be a short range wireless device, such as one that operate sin accordance with a Bluetooth® protocol and is operative to send signals to a portable electronic device, such as a smartphone, which is configured with application specific software (APP) in order to provide immediate feedback to a user or supervisor as to an amount of exposure to vibrational shocks, the total force endured as well as the maximum shocks measured.

Preferred embodiments of the present invention will now be described, by way of example only and with reference to the drawings, in which:

DETAILED DESCRIPTION OF PREFERRED EMBODIMENTS OF THE INVENTION

Figure 1:
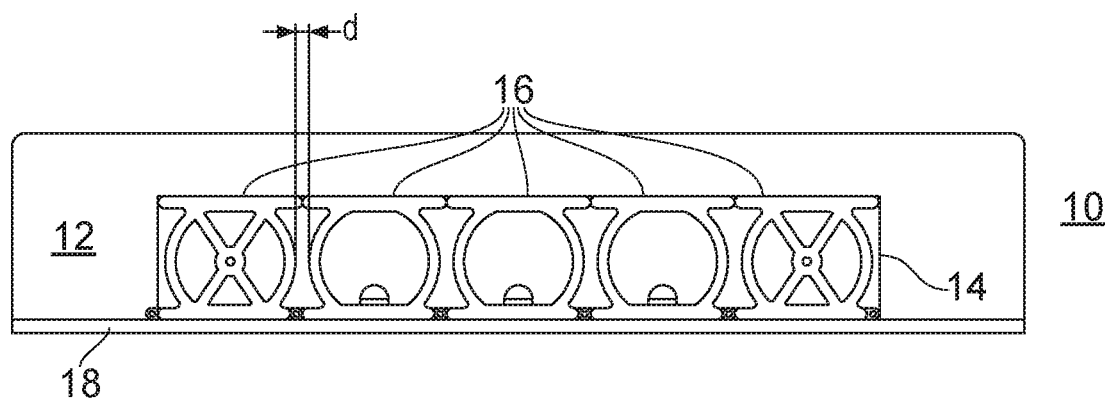
FIG. 1 is a diagrammatic cross-sectional view of an embodiment of a shock mitigation seat according to the present invention.

Referring to the diagrammatic view of FIG. 1, there is shown a cross-sectional view of an embodiment of a shock mitigation seat 10 according to the present invention. The seat 10 comprises a shaped block of conventional cushion foam 12 in the underside of which is a rectilinear recess 14 housing a plurality of shock absorbing members 16. In this embodiment the recess 14 is closed, and the shock absorbing members 16 rest upon, a solid base 18 which may be, for example formed of plywood or a resiliently deformable substrate formed from a synthetic plastics material The whole is encased in a conventional cloth material (not shown) and optionally covered with cushioning or foam. The base 18 is not an essential feature as the shock absorbing members 16 could be simply retained in position by the cloth material. In such a case, seat 10 is placed on a solid surface of the vehicle or craft in which it is to be used.

Figure 2:
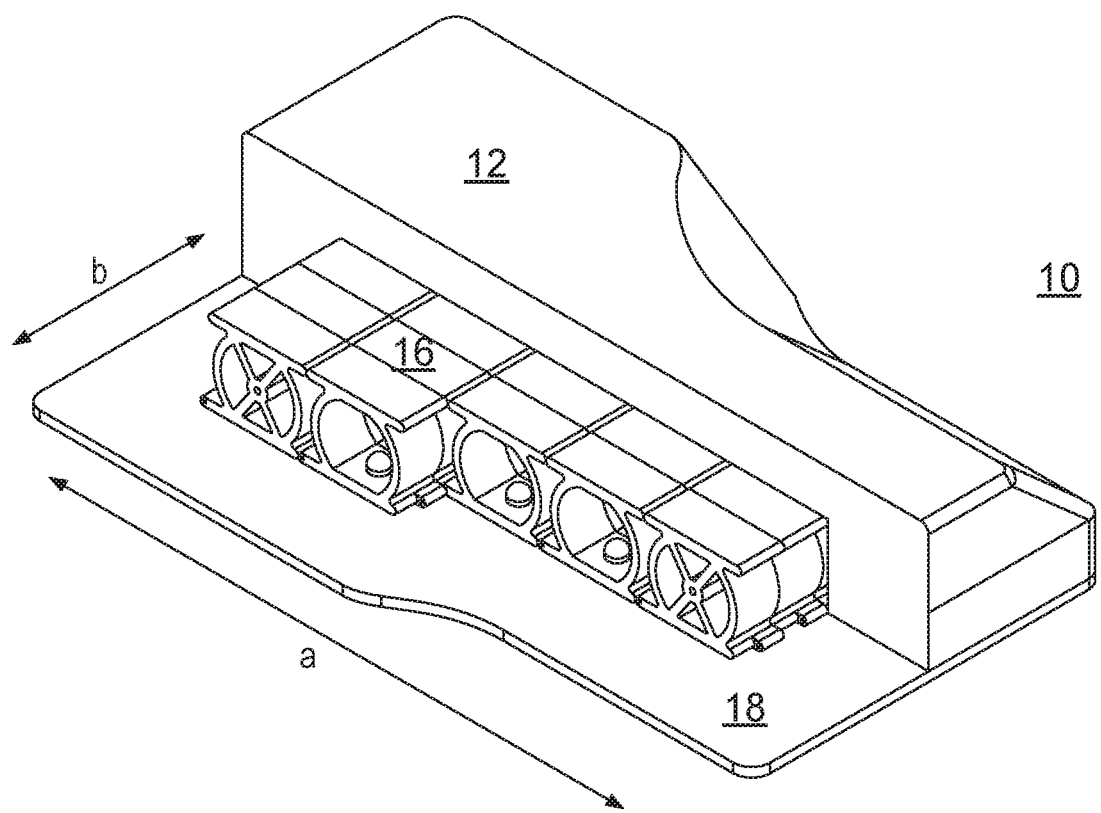
FIG. 2 is a part cut-away perspective view of the seat illustrated in FIG. 1.

FIG. 2 is a part cut-away perspective view of the seat 10 illustrated in FIG. 1. As illustrated in FIG. 2, there are a plurality of shock absorbing members 16 in both a longitudinal direction (a) and lateral direction (b). Five rows of shock absorbing members 16 extending in lateral direction (b) are illustrated. Instead of each row consisting of a plurality of shock absorbing members 16, each row could consist of a single elongate member. Alternatively, two or more shorter elongated members could be substituted in each row. Alternative combinations may enable two or more shorter members to form one row whilst an adjacent row is defined by a single member and this pattern is repeated. The particular combination of members being dictated by the nature of the loads, the type of vehicle in which shock mitigation seats are deployed and cost of materials.

Figure 3:
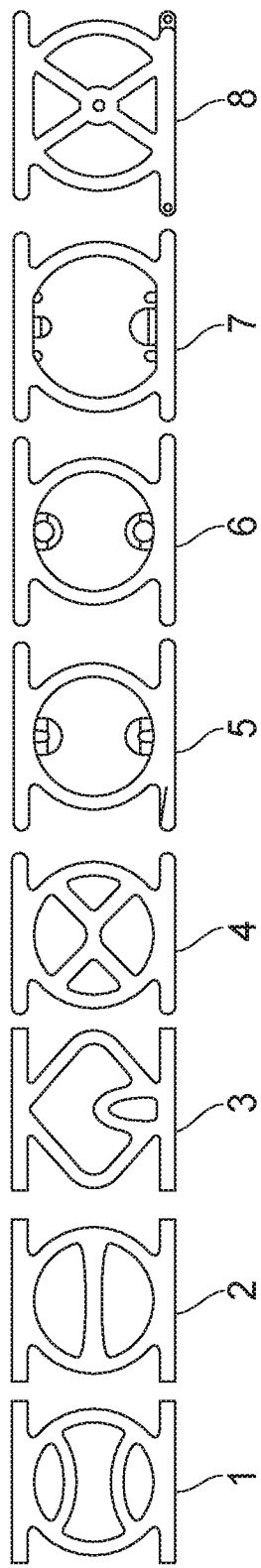
FIG. 3 illustrates eight variations in the configuration of individual shock absorbing members.

As illustrated in FIGS. 1 and 2, not all of the shock absorbing members 16 are of the same configuration. The arrangement shown is beneficial but not essential. Indeed, the configuration of any individual shock absorbing member 16 can take many different forms. FIG. 3 illustrates some of the different configurations which can be used. Although they are preferred forms, the shock absorbing members 16 illustrated in FIGS. 1, 2 and 3 are not of the most basic configuration which can be used.

As shown, they all have integral upper and lower flat "platforms". The underlying basic shape could, in most cases, be described in very simple terms as: having an "I" beam cross-section in which the central upright is replaced by an "O". However, the "platforms" (or horizontals of the "I" beam shape) are beneficial but not essential. In a very basic form, the shock absorbing members 16 could be lengths of a circular or oval cross-section tube.

Importantly shock absorbing members 16 are capable of resilient compression by a shock impact. The shock absorbing members 16 are positioned one adjacent another and are such that at a certain stage of compression an individual shock absorbing member 16 resiliently deforms and comes into contact with one or more adjacent individual shock absorbing members 16 which thereby increase its resistance to further compression.

The material used to fabricate the shock absorbing members 16, as well as the relative dimensions of their structure, are chosen in accordance with the maximum "g" force (magnitude of shock impact) that the seat is designed to cope with an expected occupant mass In the art and industries, the most often quoted categories are: 3 g, 4 g, 5 g, 6 g, 8 g and 10 g—where "g" is sometimes referred to as "nominal peak acceleration" and the usual "nominal impact duration" is taken as 0.1 second. These are the standards often used in test rig apparatus. They are the half-sine pulse shapes in laboratory tests to simulate typical vertical wave impact severities observed in mono-hull planing craft during high speed operations in rough seas.

For example, it is considered that commercial and leisure boats should be capable of withstanding 5 g shocks, search and rescue boats 6 g shocks and various classes of military boats 8 g or even 10 g.

It has been found that synthetic plastics material, such as thermoplastic polyurethane (TPU) polymers, are suitable for manufacture of the illustrated shock absorbing members 16. Manufacture is typically by extrusion or injection moulding.

Specific examples of thermoplastic polyurethane (TPU) polymers which have been specifically tested for manufacture of the illustrated shock absorbing members 16 are as follows. These tests were undertaken for construction of an embodiment of the invention, of the illustrated form, capable of withstanding category 6 g impacts. Such seats are considered suitable for inshore and coastal waters and a maximum speed, depending on hull type, of between 20 and 40 knots. The materials tested are: IROGRAN® A 85 P 4394 and Desmopan® 790. Both are of a similar Shore hardness.

Further details of these two materials can be found on the respective manufacturer's website.

Concerning typical dimensions for the illustrated shock absorbing members 16: the radius of the outer circle of the illustrated central "O" portion of the members is preferably of the order of 26 mm and the "at rest" separation between the outer circle of the illustrated central "O" portion of adjacent members is preferably of the order of mm (distance "d" in FIG. 1). The thickness of the central "O" portions and the depth, or height, of the "platforms" is preferably 4 mm. A typical width for the illustrated shock absorbing members 16 shown in FIG. 2 (i.e. in the "b" direction) is 25 mm.

It will be noted that in the row of five illustrated shock absorbing members 16 shown in FIGS. 1 and 2, the central three are provided at the bottom, internally of the central "O" portions, with an integral upward projecting dome shaped bump or stop. The purpose of these bumps or stops is to reduce the effect should the shock absorbing members approach a bottoming-out compression—due to impacts beyond the anticipated maximum. Rather than the sudden limit to any further movement which occurs in the above described conventional long-travel seats (i.e. metal-to-metal contact); this variation of the shock absorbing members 16 provides a rapid increase in resistance to further compression but avoids a sudden stop. That is, the material/shape of the bump or stop is capable of compression (albeit relatively limited) and equally the then touching portion of the upper "platform" is capable of compression.

One reason why the internal configuration of the two end shock absorbing members 16 shown in FIGS. 1 and 2 differs from the central three members 16 is that the compressive force likely to be experienced in those locations will differ from those experience in the central portion of the seat.

It will be noted that all of the shock absorbing members 16 illustrated in the accompanying drawings have a high proportion of "open space" at the central part (or "O" portion) of their configuration. That is, the core configuration of at least one shock absorbing member is in the form of an annulus of resilient material. This is an important preferred feature of the invention. It provides a beneficial impact absorption compression of the members. In particular it enables the desired effect that, at a certain stage of compression, the individual shock absorbing member resiliently deforms and comes into contact with one or more adjacent individual shock absorbing members; which thereby increases resistance to further compression.

Figure 4:
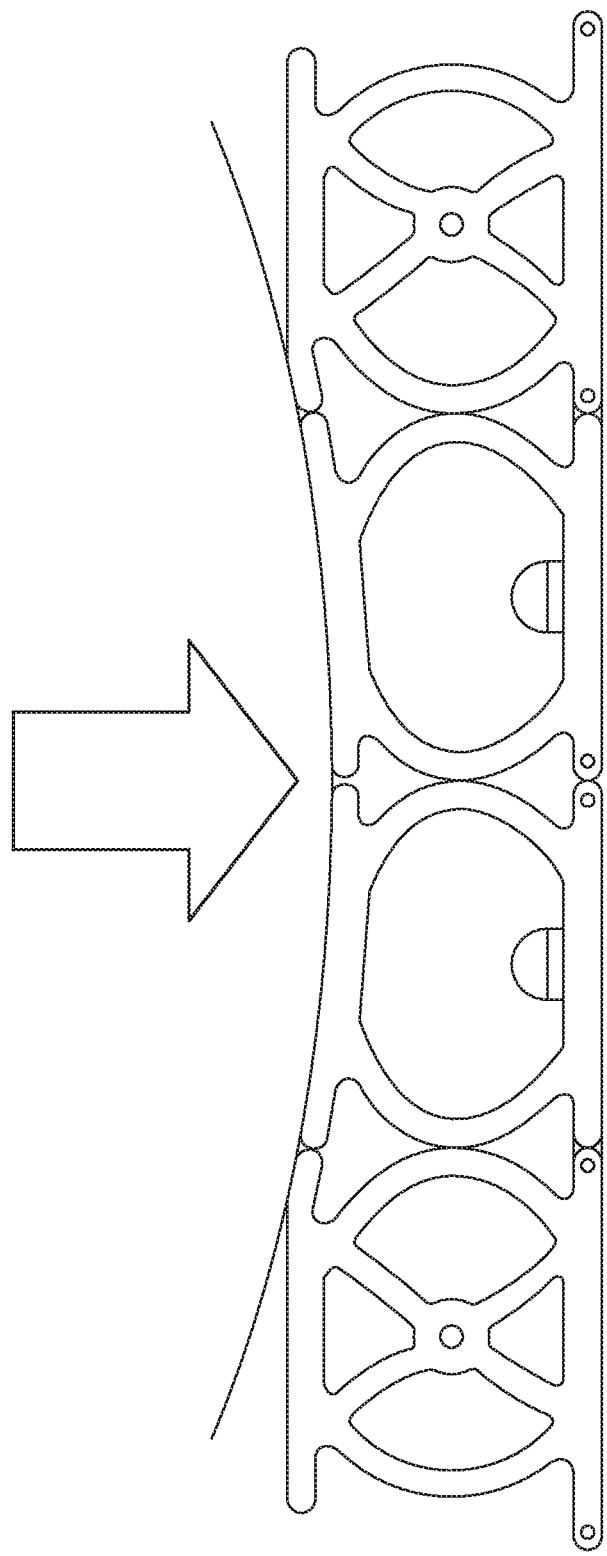
FIG. 4 illustrates the interaction between adjacent shock absorbing members as they are subject to compression.

This interaction may be more complex than might at first be imagined. FIG. 4 seeks to illustrate how the adjacent members 16 might start to interact. In FIG. 4, the notional compressive force is indicated by the curved line and arrow. The interaction is, of course, a dynamic process and as such cannot be fully illustrated by one or two drawings.

Further variations and modifications are possible. Attention is here directed to example 7 shown in FIG. 3. As with examples 5 and 6, upper bumps or stops are provided. They essentially provide or duplicate the purpose and action of the lower bump or stop explained above with reference to FIGS. 1 and 2. However, in example 7 smaller bumps are provided on either side of both the upper and lower bumps or stops.

Figure 5:
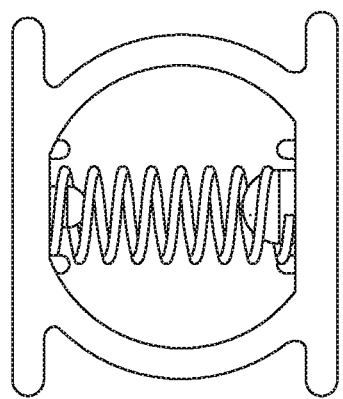
FIG. 5 illustrates an embodiment in which a spring is added to assist in a rapid return of a shock absorbing member to its initial configuration.

The purpose of these is to assist in locating and retaining a, preferably, metal spring 20—as illustrated in FIG. 5. The purpose of introducing such a spring 20 is to enhance the return of the TPU member to its starting configuration in a timely manner. The significance of additional springs increases with the increase in impact shock frequency.

Figure 6A:
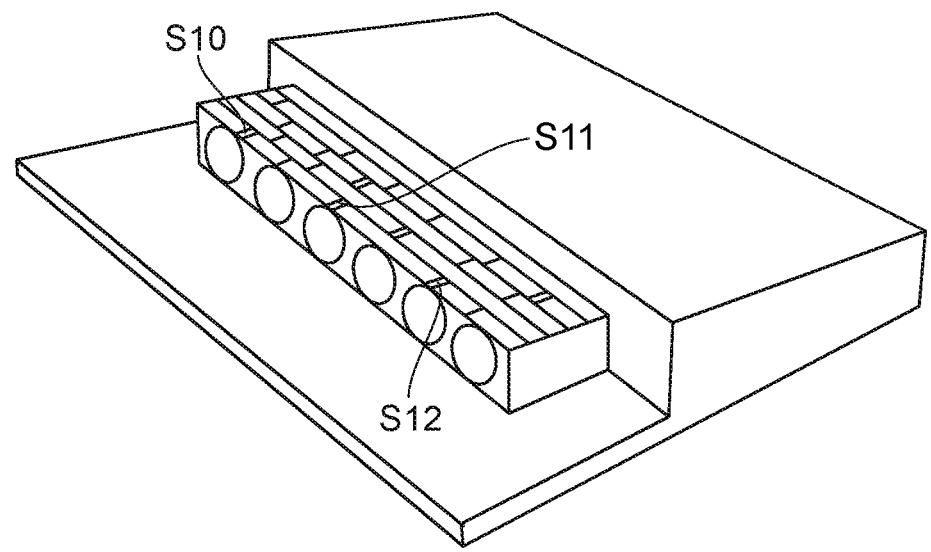
FIGS. 6A and 6B show overall diagrammatic views of one example of a shock measurement and monitoring system may be employed with the shock mitigation seat.
Figure 6B:
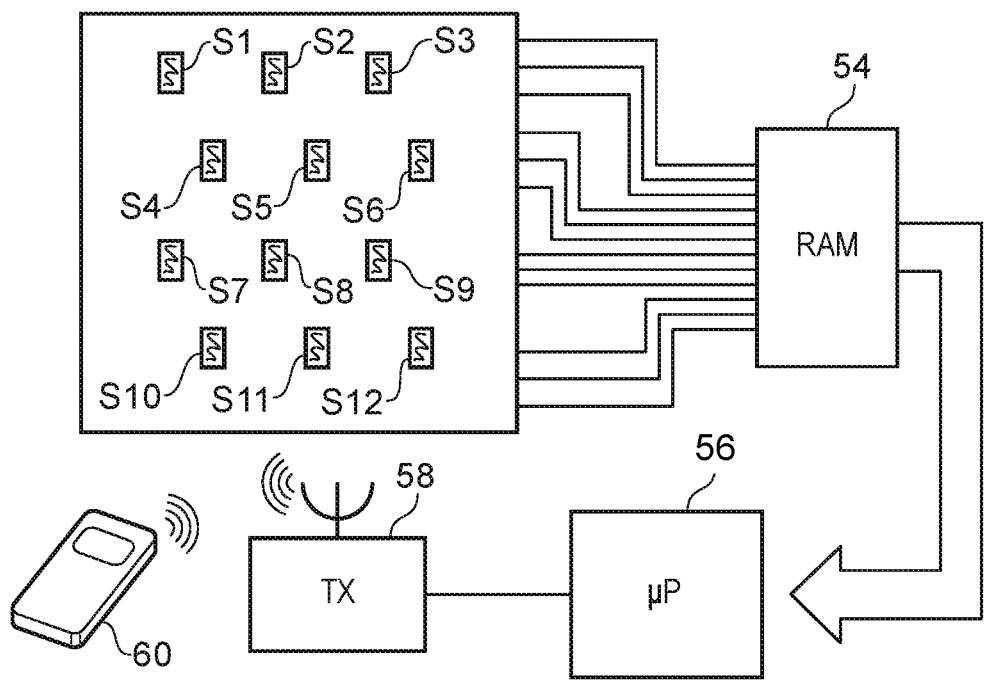

Referring now to FIGS. 6A and 6B show overall diagrammatic views of one example of a shock measurement and monitoring system 50 which includes the aforementioned shock mitigation seat. By way of example reference is made to the embodiment of the shock mitigation seat 52 shown in FIG. 2. Twelve sensors S1, S2, S3 . . . S12 are distributed across the surface of the seat. The sensors are arranged in a grid of four rows of three sensors although it will be appreciated that other patterns may be used including circular patterns or different arrays of individual sensors.

Figure 7:
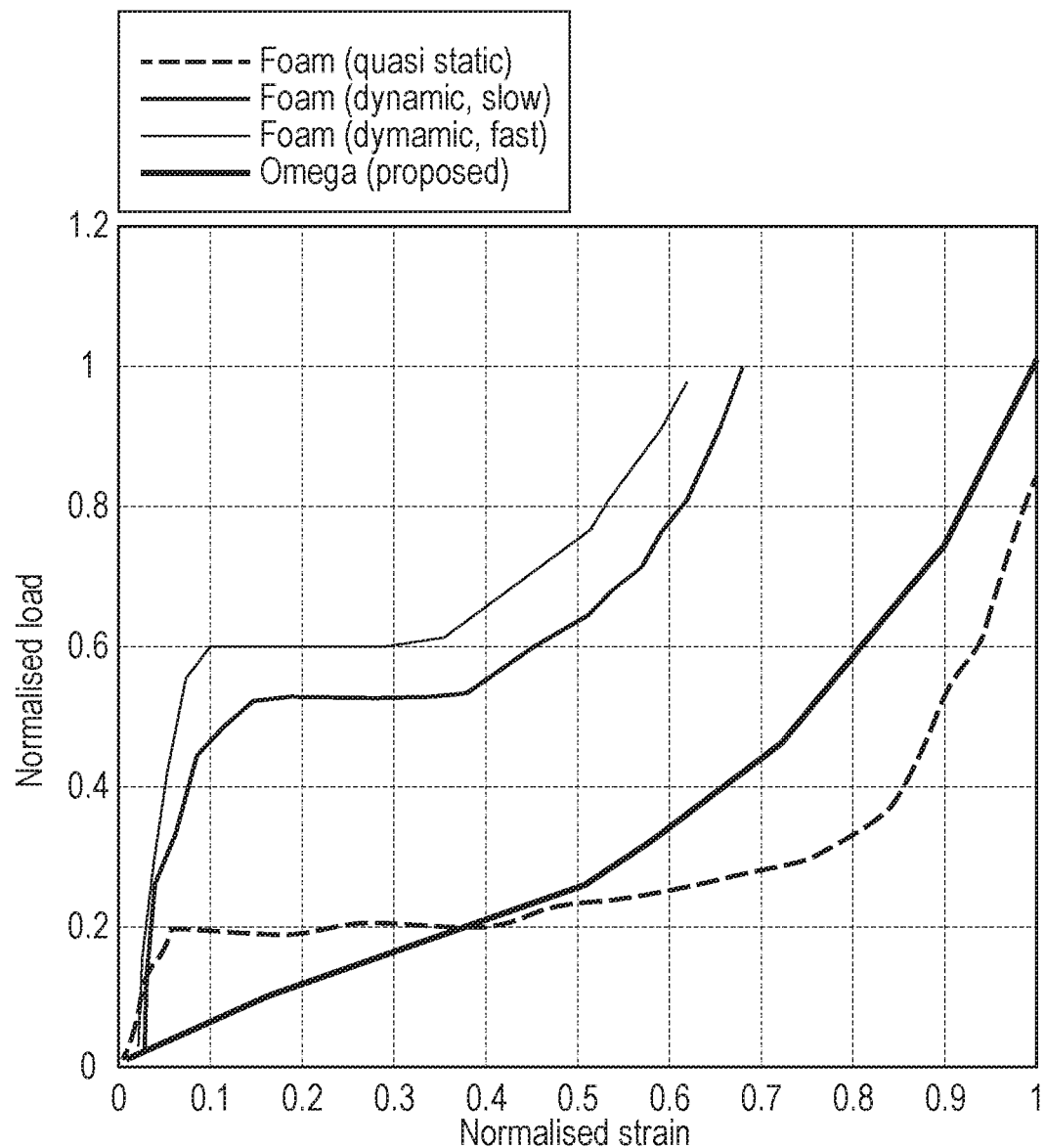
FIG. 7 is a graph that depicts the compression of one embodiment under loading when compared to conventional foam material.

Sensors S1-S12 are ideally strain gauges or accelerometers and are operative to output a signal which is indicative of an applied force or load (as shown for example in the graph of FIG. 7). The signals are optionally stored in dynamic memory, such a random access memory (RAM) 54 or signals may be output directly to a microprocessor 56. The microprocessor 56 derives values from the signal, in accordance with software, and outputs signals which are indicative of individual forces experiences by one of the sensors S1 to S12, as well as an aggregate or total force to which the seat has been subjected. Optionally maximum and minimum forces which have been encountered may be provided by the microprocessor 56. Sensors include a displacement sensor and/or accelerometer.

Transmitter 58 is operative to send signals to a portable electronic device 60, such as a smartphone, which is configured with application specific software (APP) in order to provide immediate feedback to a user or supervisor as to an amount of exposure to vibrational shocks, the total force endured as well as the maximum shocks measured.

FIG. 7 is a graph that depicts the compression of a variant of the invention under load compared to conventional foam. FIG. 7 shows how non-linear properties are harnessed to the benefit of the seat occupant (not shown) through initial low stiffness followed by controlled increase in stiffness.

It will be appreciated that the invention has been described by way of example only and variation may be made to the aforementioned embodiments without departing from the scope of the invention as defined by the claims.

The invention claimed is:

1. A shock mitigation seat including a plurality of individual shock absorbing members resilient to compression from a shock impact, the shock absorbing members being positioned one adjacent another and such that at a certain stage of compression an individual shock absorbing member resiliently deforms sufficiently to come into contact with one or more laterally adjacent individual shock absorbing members which thereby increases its resistance to further compression, wherein the general configuration of at least one shock absorbing member is in the form of an annulus of resilient material.

2. The shock mitigation seat according to claim 1, wherein shock absorbing members are generally circular in cross-section.

3. The shock mitigation seat according to claim 1, wherein at least one of the shock absorbing members has at least one cross-sectional strengthening rib.

4. The shock mitigation seat according to claim 3, wherein the thickness of the cross-sectional strengthening ribs is between 1 mm thick and 5 mm thick.

5. The shock mitigation seat according to claim 1, wherein the shock absorbing members are supported on a foot.

6. The shock mitigation seat according to claim 5, wherein the foot comprises a planar sheet of a flexible material.

7. The shock mitigation seat according to claim 5, wherein the foot is rectangular and contacts an adjacent foot which supports an adjacent shock absorbing member.

8. The shock mitigation seat according to claim 7, wherein adjacent feet are offset or staggered with respect one to another.

9. The shock mitigation seat according to claim 7, wherein adjacent feet are interconnected.

10. The shock mitigation seat according to claim 9, wherein adjacent feet are interconnected by way of a hinge.

11. The shock mitigation seat according to claim 10, wherein the hinge comprises a length of wire or flexible line.

12. The shock mitigation seat according to claim 1, wherein a foam layer is placed thereon and/or thereunder.

13. The shock mitigation seat according to claim 12, wherein the, or each, foam layer is removable and replaceable.

14. The shock mitigation seat according to claim 1, which is shaped and dimensioned for use on a cycle or motorcycle or mountain bicycle.

15. The shock mitigation seat according to claim 1, which is shaped and dimensioned for use in an off-road vehicle.

16. The shock mitigation seat according to claim 12, wherein the thickness of each layer of foam is between 5 mm thick and 50 mm thick.

17. The shock mitigation seat according to claim 1, further comprising first and second layers of shock absorbing members, wherein the resilient material forming the first layer has a first shock absorbance characteristic and the resilient material forming the second layer has a second shock absorbance characteristic.

18. The shock mitigation seat according to claim 1, wherein the shock absorbing members are coated with a fire retardant.

19. The shock mitigation seat according to claim 1, wherein sections of resilient materials are extruded.

20. The shock mitigation seat according to claim 1, wherein the shock absorbing members are ellipsoid in cross section.

21. The shock mitigation seat according to claim 20, wherein major axes of adjacent ellipsoids are perpendicular one to another.

22. The shock mitigation seat according to claim 1, wherein a rheological fluid is included in a sealed container housed within at least one section of a shock absorbing member in order to provide an active force absorbing device.

23. The shock mitigation seat according to claim 22, wherein the rheological fluid includes a ferromagnetic material, such as iron filings.

24. The shock monitoring system includes the shock mitigation seat according to claim 1 and at least one sensor which is operable to detect a force, such as compressive force, a tensile force, a twisting or torsional force and an acceleration force, and to provide a feedback signal indicative of the nature of the force.

25. The shock monitoring system according to claim 24, further comprising a processor and a memory, the processor is operative to monitor the feedback signals and derive a value which is indicative of a maximum shock load (impulse) which exceeds a user defined threshold; and a cumulative load which is indicative of a total of shock loads (vibration forces), to which a seat occupant has been subjected in a predefined time, and the memory records the maximum shock load and the total shock load.

26. The shock monitoring system according to claim 25, further comprising a wireless transmitter which is operative to transmit signals from the memory which include maximum shock load data and total shock load data to a remote receiver for storage on a database, analysis by a computer or presentation on a display.

* * * * *